(12) United States Patent
Whitehead et al.

(10) Patent No.: US 7,286,280 B2
(45) Date of Patent: Oct. 23, 2007

(54) BRIGHTNESS ENHANCEMENT FILM FOR BACKLIT IMAGE DISPLAYS

(75) Inventors: Lorne A. Whitehead, Vancouver (CA); Michele Ann Mossman, Vancouver (CA)

(73) Assignee: The University of British Columbia, Vancouver, British Columbia (CA)

( * ) Notice: Subject to any disclaimer, the term of this patent is extended or adjusted under 35 U.S.C. 154(b) by 0 days.

(21) Appl. No.: 11/080,565

(22) Filed: Mar. 16, 2005

(65) Prior Publication Data

US 2005/0248848 A1    Nov. 10, 2005

Related U.S. Application Data

(60) Provisional application No. 60/568,682, filed on May 7, 2004.

(51) Int. Cl.
G02B 26/00    (2006.01)

(52) U.S. Cl. .................................................. 359/296

(58) Field of Classification Search ................ 359/296, 359/263, 222, 620, 253, 252; 345/84; 348/759; 349/62

See application file for complete search history.

(56) References Cited

U.S. PATENT DOCUMENTS

| | | | |
|---|---|---|---|
| 2,378,252 A | | 6/1945 | Slaehle et al. |
| 5,395,350 A | * | 3/1995 | Summers ..................... 349/62 |
| 5,465,175 A | | 11/1995 | Woodgate et al. |
| 5,598,281 A | | 1/1997 | Zimmerman et al. |
| 5,661,531 A | | 8/1997 | Greene et al. |
| 5,739,931 A | * | 4/1998 | Zimmerman et al. ....... 359/619 |
| 5,781,344 A | | 7/1998 | Vance |
| 5,839,812 A | | 11/1998 | Ge et al. |
| 5,903,391 A | | 5/1999 | Toshima et al. |
| 5,917,664 A | | 6/1999 | O'Neill et al. |
| 6,421,103 B2 | | 7/2002 | Yamaguchi |
| 6,425,674 B1 | | 7/2002 | Su |

(Continued)

FOREIGN PATENT DOCUMENTS

CA    2474384 A1    9/2003

(Continued)

OTHER PUBLICATIONS

"Vikuiti™ Enhanced Specular Reflector (ESR)", 2002 product brochure of 3M Electronic Display Lighting, Optical Systems Division, St.Paul, MN.

(Continued)

*Primary Examiner*—Ricky Mack
*Assistant Examiner*—Tuyen Tra
(74) *Attorney, Agent, or Firm*—Oyen Wiggs Green & Mutala LLP (57) ABSTRACT

A brightness enhancement film having a monolayer of approximately hemispherical, transparent, closely packed larger diameter hemi-beads. Due to the hemi-beads' hemispherical shape, gaps remain between adjacent ones of the larger diameter hemi-beads. A substantial number of the gaps are provided with at least one approximately hemispherical, transparent hemi-bead having a diameter substantially less than the diameter of the larger diameter hemi-beads. Provision of smaller diameter hemi-beads within the gaps increases the film's reflectance value, such that the film's apparent brightness declines as a relatively smooth, continuous function of viewing angle, for viewing angles ranging from 0° (normal incidence) to about 40°, which is the preferred angular viewing range.

27 Claims, 4 Drawing Sheets

U.S. PATENT DOCUMENTS

| | | | |
|---|---|---|---|
| 6,583,555 B2 * | 6/2003 | Matsukawa et al. | 313/495 |
| 6,697,042 B1 | 2/2004 | Cohen et al. | |
| 6,865,011 B2 | 3/2005 | Whitehead et al. | |
| 2002/0140882 A1 | 10/2002 | Kitagawa et al. | |
| 2003/0071947 A1 | 4/2003 | Shiraogawa et al. | |
| 2003/0165016 A1 | 9/2003 | Whitehead et al. | |
| 2004/0174584 A1 | 9/2004 | Whitehead et al. | |

FOREIGN PATENT DOCUMENTS

| | | |
|---|---|---|
| WO | WO 03/075085 | 9/2003 |

OTHER PUBLICATIONS

"Vikuiti™ Enhanced Specular Reflector (ESR) Application Guidelines", 2003 brochure of 3M Electronic Display Lighting, Optical Systems Division, St.Paul, MN.

A High Reflectance, Wide Viewing Angle Reflective Display Using Total Internal Reflection in Micro-Hemispheres, Mossman et al, Society for Information Display, 23rd Intl. Display Research Conf., Sep. 15-18, 2003, Phoenix, AZ.

* cited by examiner

BRIGHTNESS ENHANCEMENT FILM FOR BACKLIT IMAGE DISPLAYS

REFERENCE TO RELATED APPLICATION

This application claims the benefit of U.S. provisional patent application Ser. No. 60/568,682 filed 7 May 2004.

TECHNICAL FIELD

This invention improves the angular viewing range of backlit image displays.

BACKGROUND

Figure 1:
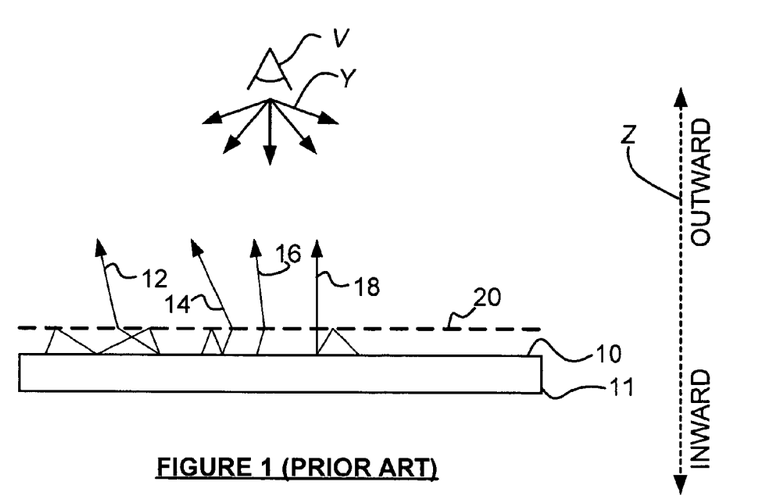
FIG. 1 is a cross-sectional side elevation view, on a greatly enlarged scale, of a portion of a prior art planar light emitting surface associated with a prior art non-light absorbing structured optical film.

Brightness enhancement films such as Vikuiti™ film available from 3M Company, St. Paul, Minn. are transparent optical films that increase display (typically, liquid crystal display—LCD) brightness through improved light management. FIG. 1 schematically depicts the operation of a typical brightness enhancement film. The "inward" and "outward" directions are indicated by double-headed arrow Z. A plane surface 10 (often the outward viewing surface of a so-called light box 11 which observer V looks at through an angular range of viewing directions Y) emits light rays 12, 14, 16, 18, etc. diffusely (that is, with a so-called Lambertian distribution) such that the apparent luminance of surface 10 is the same from all viewing directions. Surface 10 has high diffuse reflectance, such that light box 11 has a high surface reflectance $R_S$. In some circumstances, $R_S$ can be very close to 1.0, which is the theoretical maximum (but, in practice, unattainable) reflectance value. For example, a light guide of the type typically used to illuminate the LCD display of a laptop type computer can have very high reflectance. The following discussion assumes that $R_S$ is 1.0, but can easily be generalized to lower values of $R_S$, in a manner well know to persons skilled in the art.

As shown in FIG. 1, a non-light absorbing prior art optical film 20 having a microstructured surface (e.g. bearing a large plurality of microreplicated prismatic structures) is placed adjacent and substantially parallel to the light-emitting plane of surface 10. As long as it is possible for some light to pass through film 20, then all light which passes from surface 10 to film 20 is eventually emitted through film 20. This is because no light is absorbed by film 20—any light incident upon film 20's inward surface that is not transmitted through film 20 is reflected by film 20 back toward surface 10. Such reflected light is again reflected, diffusely, by surface 10's light-emitting plane, a fraction of this twice-reflected light is transmitted through film 20, and the remainder is reflected by film 20 back toward surface 10, and so on ad infinitum. The intensity of the transmitted light can be described by a geometric series of the form:

$$T_T = (1 - R_d)(1 + R_d + R_d^2 + R_d^3 + \ldots) = \frac{1 - R_d}{1 - R_d} = 1 \qquad (1)$$

where $R_d$ is the reflectance of film 20 to diffuse light. A more intuitive way to describe the situation is that since the light cannot be absorbed by film 20 or by light-emitting surface 10, it is all eventually emitted.

However, with film 20 in place, observer V does not necessarily perceive a display incorporating surface 10 and film 20 as having the same luminance when viewed from different ones of angular viewing directions Y. For example, a microstructured surface film 20 having an essentially transmissive appearance when viewed from a roughly normal (i.e. perpendicular) viewing direction, may have an essentially reflective appearance when viewed at steeper viewing angles. Clearly the spatially averaged luminance of the display, as perceived by the observer, must be lower at such steep angles. Since the total amount of light is the same, regardless of the range of angles over which the light is transmitted, it follows that the spatially averaged luminance of the display is higher when surface 10 is viewed from the normal direction.

If $R_d$ is the reflectance of film 20 to diffuse (Lambertian) light as above, and if $T_n$ is the transmittance of film 20 when viewed in an intended normal (i.e. perpendicular) viewing direction from the intended backlit (i.e. inward) side of film 20, then the relative brightness gain, $G_n$, in the normal viewing direction is:

$$G_n = \frac{T_n}{1 - R_d} \qquad (2)$$

$G_n$ can be optimized by making film 20 as reflective as possible, without diminishing film 20's ability to transmit light in the normal viewing direction. For example, some Vikuiti™ brightness enhancement films available from 3M Company have a transmittance value $T_n \approx 0.9$ and a reflectance value $R_d \approx 0.5$, implying a theoretical maximum gain value of $G_n \approx 1.8$. In practice, the reflectance of light box 11's light emitting surface is less than 1.0, so this theoretical maximum gain value cannot be attained in practice, but it is a useful metric for comparison purposes.

Another desirable characteristic for a brightness enhancement film is a smooth variation of the light transmittance characteristic T as a function of viewing angle, since in many circumstances there will be a wide range of viewing angles, e.g. the preferred 0° (normal incidence) to 40° angular viewing range. Some prior art brightness enhancement films exhibit a very sharp transition between ranges of viewing directions having very high light transmissivity and ranges of viewing directions having very low light transmissivity. It is often necessary to add one or more light diffusers to the display to minimize this problem. This invention addresses the problem in a manner which increases the brightness of an LCD type display while providing a smooth variation in luminance as a function of viewing angle.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense. Furthermore, as used herein, the terms "hemisphere," "hemispherical" and "hemibead" include somewhat smaller volume shapes that may also be derived from cross-sections of spheres.

Figure 2:
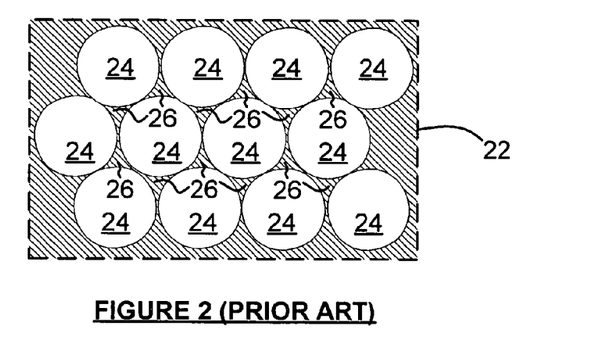
FIG. 2 is a top plan view, on a greatly enlarged scale, of a small portion of a film incorporating a plurality of prior art hemispherical (or approximately hemispherical) beads in a closely packed arrangement.

FIG. 2 depicts a small portion of a thin transparent film (i.e. sheet) 22 having a large plurality of solid transparent dielectric hemispherical (or approximately hemispherical) hemi-beads 24 distributed in a monolayer and protruding from at least one surface of the solid transparent dielectric polymeric material used to form film 22. Hemi-beads 24 have a refractive index $\eta_1$. The polymeric material used to form film 22 has a refractive index $\eta_2 \sim \eta_1$. An observer (not shown in FIG. 2) looks at the outward viewing surface of film 22 through an angular range of viewing directions. Film 22 and hemi-beads 24 have the general characteristics and may be formed as described in international patent publication WO 03/075085 dated 12 Sep. 2003, which is incorporated herein by reference. But, unlike the WO 03/075085 display, no electrophoretic or other liquid medium is required by displays formed in accordance with this invention. Furthermore, whereas the WO 03/075085 display provides hemi-beads on the inward surface of a sheet (i.e. film) having a substantially flat outward viewing surface, in preferred embodiments of the present invention the outward viewing surface of film 22 (i.e. the display surface that is directly viewed by the observer) bears hemi-beads 24 and the inward surface of film 22 is substantially flat. Film 22 may be formed of a polymer material such as a polyolefin, polyester, polyamide, polycarbonate, or polyvinyl resin. Persons skilled in the art will understand that many other materials are suitable for use in forming film 22.

Hemi-beads 24 may be distributed in a monolayer either randomly or in a well defined manner on film 22. In preferred, but non-limiting, embodiments of the invention, hemi-beads 24 are distributed on film 22's outward surface in a well defined manner, such as the closely packed monolayer arrangement shown in FIG. 2. However, even if hemi-beads 24 are packed together as closely as possible, interstitial gaps 26 unavoidably remain between adjacent ones of hemi-beads 24. Light rays incident upon any of gaps 26 do not make a useful gain contribution to images displayed on film 22 and may even cause undesirable image artifacts. While these artifacts are invisibly small, and therefore should not detract from the display's appearance, they do detract from film 22's net average reflectance. The transmittance value $T_n$ for a closely packed hemi-bead structure like that depicted in FIG. 2 is $T_n \approx 0.85$. Assuming a reflectance value $R_d \approx 0.5$, as above, equation (2) yields a maximum theoretical relative brightness gain value of $G_n \approx 1.7$.

Figure 3:
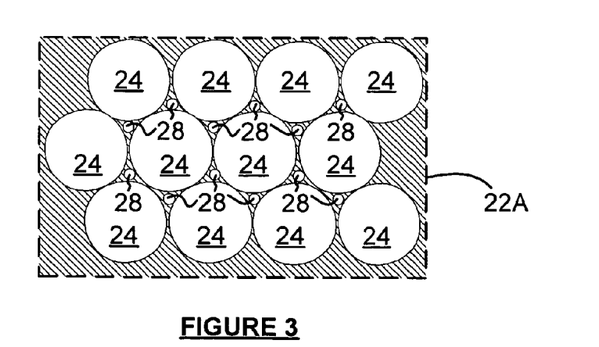
FIG. 3 depicts the FIG. 2 film portion, with smaller hemispherical (or approximately hemispherical) beads positioned in the interstitial gaps between the larger beads to increase the beads' packing efficiency in accordance with the invention.

In accordance with the invention, one or more smaller diameter hemi-beads 28 are provided in each gap 26 between the adjacent larger diameter hemi-beads 24, to form a brightness enhancement film (i.e. sheet) 22A as shown in FIG. 3. Provision of smaller diameter hemi-beads 28 within gaps 26 increases the reflectance value of the FIG. 3 film 22A to a value of $R_d \approx 0.53$, yielding a maximum theoretical gain value of $G_n \approx 1.8$, which is on a par with the gain values attainable by the best currently available brightness enhancement films. Various techniques can be used to provide smaller diameter hemi-beads 28 in gaps 26. For example, hemi-beads 24 and 28 may constitute a random distribution of differently sized beads, partially embedded in a thin layer of adhesive material having a refractive index matching that of hemi-beads 24 and 28, as described in WO 03/075085 (i.e. ($\eta_1 \approx \eta_2 \geq 1.55$ with $\eta_1 \approx \eta_2 \geq 1.6$ being preferred, e.g. if film 22A and hemi-beads 24, 28 are formed of a material such as polycarbonate). In such case, the smaller diameter hemi-beads will, to a large extent, naturally pack interstitially between the larger diameter hemi-beads. Hemi-beads 24 preferably have an average diameter between 2 microns and 50 microns. More particularly, at least some of hemi-beads 24 must have a minimum diameter of 2 microns in order to reflect light by total internal reflection ("TIR"). If hemi-beads 24 all have the same diameter, then their minimum diameter is 2 microns. If hemi-beads 24 have different diameters, then the smallest hemi-beads must have a minimum diameter of 2 microns.

Alternatively, larger and smaller hemi-beads may be simultaneously formed in predefined sizes and in a predefined monolayer array using a suitably micro-machined metal mold, to form a molded monolayer of larger and smaller hemi-beads, with one or more smaller diameter hemi-beads in each interstitial gap between the adjacent larger diameter hemi-beads. As a further alternative, hemi-beads 24 and 28 may be approximately hemispherical members transparently affixed to the outward surface of the sheet used to form film 22A.

No arrangement of circular or approximately circular cross-sectioned elements such as hemi-beads 24, 28 can completely eliminate gaps 26. However, practically useful incremental increases in packing efficiency can be attained by providing, within a substantial percentage of film 22A's gaps 26, one or more hemi-beads 28 having successively smaller diameters, ad infinitum. Although provision of hemi-beads 28 within any percentage of film 22A's gaps 26 will increase packing efficiency, and although a hexagonally closest packed array has the best packing efficiency, from a practical fabrication perspective cubic packing of hemi-beads having a single size yields a reasonably closely packed array. The packing efficiency of such a cubic array is π/4 or ~78% (the area of a circle of radius r divided by the area of a concentric square having sides of length 2r). If successively smaller diameter hemi-beads are placed interstitially between the adjacent larger diameter hemi-beads, one may form a hemi-bead array having a packing efficiency approaching 100%. A hexagonally closest packed array comprising hemi-beads of a single larger diameter and hemi-beads of a single smaller diameter packed interstitially between the larger diameter hemi-beads represents a reasonable practical limit for a regular array. Such an array has a packing efficiency of about 94%, which may be increased if a random distribution of many differently sized hemi-beads is used instead of beads of two different sizes as aforesaid.

Spheres, and portions of spheres such as hemispheres, have the useful property that they are the same shape when viewed from any azimuthal angle. Consequently, incident light rays that undergo TIR once within such shapes will continue to do so until they escape through the same surface through which they entered, which may explain the high $R_d$ value. Evidence of this can be seen in FIGS. 4A–4G, which show the appearance of the flat side of a hemi-bead 24 when viewed from various angles. More particularly, FIGS. 4A–4G show that hemi-bead 24's reflectance is maintained over a broad range of incidence angles, thus enhancing the wide angular viewing characteristic and apparent brightness of a display incorporating a brightness enhancement film bearing a large plurality of such hemispheres.

Figure 4A:
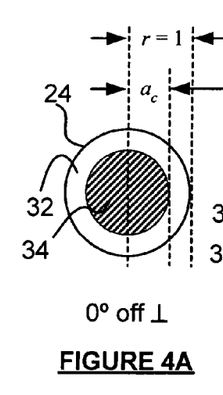
FIGS. 4A, 4B, 4C, 4D, 4E, 4F and 4G depict a hemispherical element, as seen from viewing angles which are offset 0°, 15°, 30°, 45°, 60°, 75° and 90° respectively from the perpendicular.
Figures 4B, 4C:
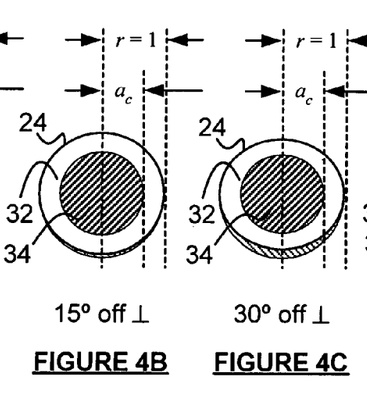
Figure 4D:
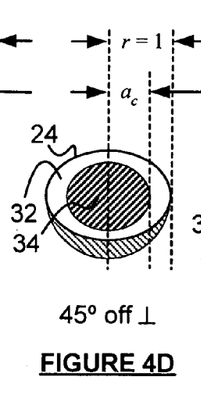
Figures 4E, 4F:
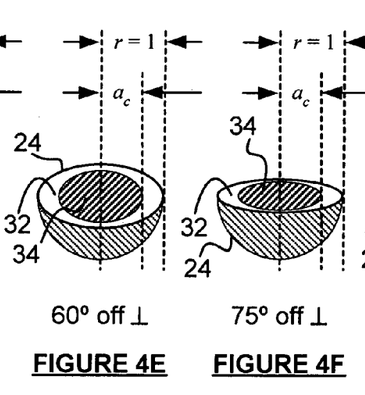
Figure 4G:
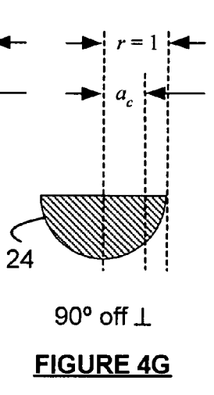

Specifically, FIG. 4A shows hemi-bead 24 as seen from perpendicular incidence—that is, from an incidence angle offset 0° from the perpendicular. Hemi-bead 24 has a normalized radius r=1 and a refractive index $\eta_1$. The air medium adjacent the inward side of hemisphere 30 (i.e. the side opposite the display's outward viewing surface) has a relatively low refractive index $\eta_3$~1.0.

A light ray perpendicularly incident on hemi-bead 24 at a radial distance a from hemi-bead 24's centre will be totally internally reflected by hemi-bead 24 if $a \geq a_c$, where $a_c = \eta_3/\eta_1$. The region of hemi-bead 24 for which $a \geq a_c$ forms an annulus 32, and is depicted as white in FIGS. 4A–4G, corresponding to the fact that this is the region of hemi-bead 24 which reflects incident light rays by TIR, as explained in international patent publication WO 03/075085. Annulus 32 surrounds a circular region 34 which is depicted as dark, corresponding to the fact that this is the non-reflective region of hemi-bead 24 within which incident light rays do not undergo TIR. Such non-reflected rays are transmitted through hemi-bead 24. Undesirable image artifacts are avoided if hemi-beads 24 are small (i.e. have an average diameter between 2 microns and 50 microns).

FIGS. 4B–4G show hemi-bead 24 as seen from incidence angles which are respectively offset 15°, 30°, 45°, 60°, 75° and 90° from the perpendicular. Comparison of FIGS. 4B–4G with FIG. 4A reveals that the observed area of reflective region 32 of hemi-bead 24 for which $a \geq a_c$ decreases only gradually as the incidence angle increases. Even at near glancing incidence angles (FIG. 4F) an observer will still see a substantial part of reflective region 32, thus giving the display a wide angular viewing range over which high apparent brightness is maintained. Since annular regions 32 are places where reflection is occurring by TIR; it can be seen that the fractional size of this reflection area depends only weakly on angle, so a good deal of reflection occurs over a very wide angular range, leading to a large value for $R_d$.

The relative brightness gain, $G_n$, attainable by arranging hemi-beads 24 in a hexagonally closest packed array—assuming hemi-beads 24 all have the same diameter—can be about the same as that of the best currently available brightness enhancement films. $G_n$ can be increased even further by inserting one or more smaller diameter hemi-beads 28 within gaps 26 such that film 22A's hemi-bead monolayer is more closely packed than film 22's hemi-bead monolayer. Moreover, the apparent brightness of film 22A declines as a relatively smooth and continuous function of viewing angle, for viewing angles ranging from 0° (normal incidence) to about 40°, which is the preferred angular viewing range. This a significant advantage, particularly in large screen display applications, where angular restrictions can be more significant.

The aforementioned relationship of reflectance and viewing angle is graphically depicted in polar form in FIGS. 5A, 5B, 5C and 5D. The plotted data was obtained utilizing Monte Carlo ray trace modeling techniques, which are well known to persons skilled in the art. For example, a light ray exiting a display can be characterized in terms of spherical coordinates, r, θ and φ, where r represents the light ray's intensity and θ and φ describe the angle at which the light ray exits the display. The angles θ and φ range from −90° to +90° and 0° to 360° respectively and correspond to the polar axes in FIGS. 5A–5D.

In this particular case, each light ray is assumed to have the same intensity, so each ray is represented by a single dot on the plot. The perceived brightness of the display as a function of viewing angle is described by the degree of clustering of these dots. For instance, in FIG. 5A, the light rays are uniformly distributed, which means that the display's brightness is fairly dim, but that brightness does not vary as a function of the viewing angle. In FIGS. 5B–5D, the light rays are clustered near the origin of the plot, which means that the display has high apparent brightness when viewed at 0° (normal incidence), but the brightness decreases significantly at higher viewing angles. A significant benefit of the present invention is that displays incorporating prior art brightness enhancement films have a relatively sharp cutoff viewing angle beyond which brightness reduction is apparent, whereas displays incorporating the invention's hemi-bead monolayer film 22A exhibit a more gradual brightness reduction as a function of increasing viewing angle.

Figure 5A:
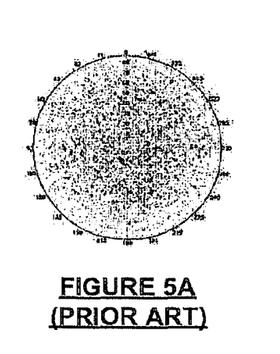
FIGS. 5A, 5B, 5C and 5D graphically depict angular distribution of light rays for two prior art structures (FIGS. 5A and 5B) and for two structures incorporating the invention (FIGS. 5C and 5D).
Figure 5B:
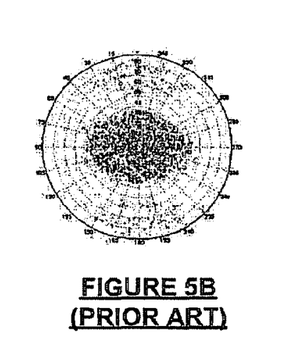
Figure 5C:
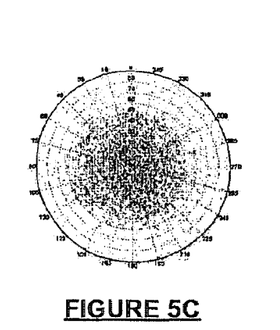
Figure 5D:
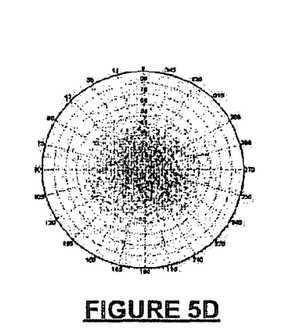

More particularly, FIG. 5A plots reflectance vs. angular distribution of light emitted by a Lambertian light source with no brightness enhancement film. The relative brightness gain, $G_n$, of the FIG. 5A structure, within an approximately 20° off-perpendicular viewing cone, is defined as 1.0 to provide a base reference for comparison purposes. FIG. 5B plots reflectance vs. angular distribution of light emitted by the same Lambertian light source with a prior art brightness enhancement film such as any one of 3M's Vikuiti™ Brightness Enhancement Film-II (BEFII) 90/24, Vikuiti™ Brightness Enhancement Film-II (BEFII) 90/50, Vikuiti™ Brightness Enhancement Film-III-Matte (BEFIII-M) 90/50, Vikuiti™ Brightness Enhancement Film-III-Transparent (BEFIII-T) 90/50, Vikuiti™ Rounded Brightness Enhancement Film (RBEF), Vikuiti™ Thin Brightness Enhancement Film (T-BEF) or Vikuiti™ Wave Brightness Enhancement Film WBEF. Monte Carlo ray trace modeling of the FIG. 5B structure revealed its relative brightness gain, $G_n$, within an approximately 40° off-perpendicular viewing cone, to be 1.8. FIG. 5C plots reflectance vs. angular distribution of light emitted by the same Lambertian light source with the FIG. 3 brightness enhancement film. Monte Carlo ray trace modeling of the FIG. 5C structure revealed its relative brightness gain, $G_n$, within an approximately 40° off-perpendicular viewing cone, to be 1.8. FIG. 5D plots reflectance vs. angular distribution of light emitted by the same Lambertian light source with the both a prior art brightness enhancement film as aforesaid and the FIG. 3 brightness enhancement film. Monte Carlo ray trace modeling of the FIG. 5D structure revealed its relative brightness gain, $G_n$, within an approximately 40° off-perpendicular viewing cone, to be 2.5. It can thus be seen that the invention has the capability to improve the brightness of a backlit display either alone or in combination with other brightness enhancement films.

The foregoing transmittance, reflectance and relative brightness gain values $T_n$, $R_d$ and $G_n$ assume that hemi-bead 24 is formed of a material having a refractive index $\eta_1 \approx 1.6$, without any anti-reflective coating.

Figures 6A, 6B:
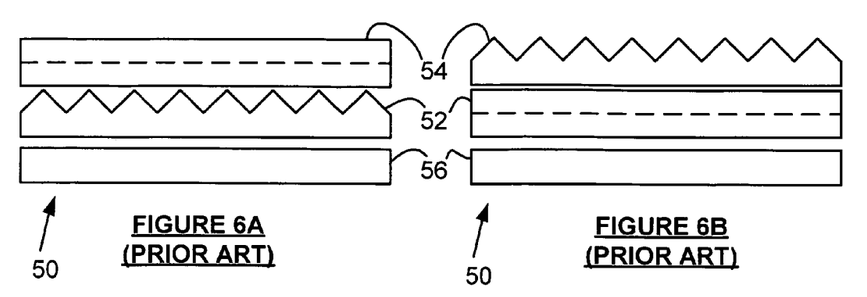
FIGS. 6A and 6B are respectively 90°-opposed cross-sectional side elevation views, on a greatly enlarged scale, of a portion of a prior art backlit display incorporating two layers of a prior art structured optical film.

FIGS. 7A–9B depict different backlit display structures which may be formed in accordance with the invention. For comparative purposes, FIGS. 6A and 6B depict a backlit display 50 incorporating two 90°-opposed layers 52, 54 of a prior art structured optical film such as Vikuiti™ Brightness Enhancement Film (BEF) having a micro-replicated prism structure, available from 3M Company, St. Paul, Minn. Display 50 is backlit by light guide 56. FIG. 5B graphically depicts the angular distribution of light rays for a prior art backlit display similar to display 50. Such displays can achieve a relative brightness gain, $G_n$, of about 1.8, but only within a restricted range of viewing angles (i.e. about an approximately 40° off-perpendicular viewing cone). FIG. 5B reveals that display 50 exhibits little or no relative brightness gain at viewing angles outside an approximately 40° off-perpendicular viewing cone.

Figures 7A, 7B:
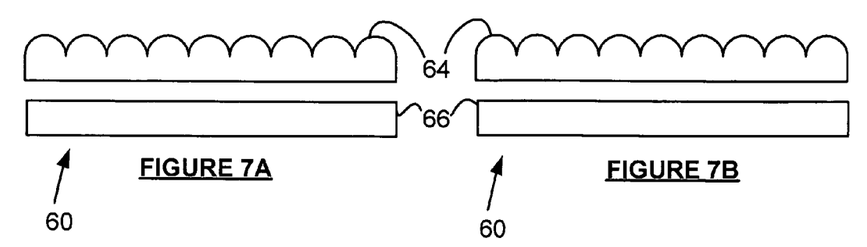
FIGS. 7A and 7B are respectively 90°-opposed cross-sectional side elevation views, on a greatly enlarged scale, of a backlit display incorporating a hemi-bead structured optical film monolayer in accordance with the invention.

FIGS. 7A and 7B depict a backlit display 60 incorporating a hemi-bead structured optical film monolayer 64. Display 60 is backlit by light guide 66. FIG. 5C graphically depicts the angular distribution of light rays for a backlit display similar to display 60. Such displays can also achieve a relative brightness gain, $G_n$, of about 1.8 within an approximately 40° off-perpendicular viewing cone. Moreover, comparison of FIGS. 5B and 5C reveals a more gradual reduction of relative brightness gain, $G_n$, as a function of viewing angle in FIG. 5C than the relatively abrupt reduction exhibited in FIG. 5B at the outward edges of the aforementioned approximately 40° off-perpendicular viewing cone. This illustrates the fact that display 60 is capable of achieving relative brightness gain, $G_n$, on a par with the best prior art backlit displays, but within a wider range of viewing angles than the best prior art backlit displays.

Figures 8A, 8B:
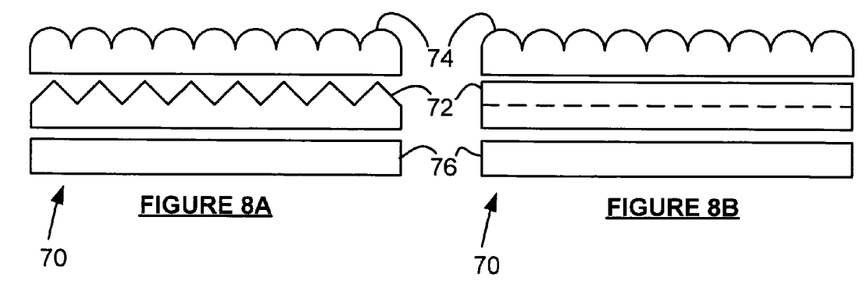
FIGS. 8A and 8B are respectively 90°-opposed cross-sectional side elevation views, on a greatly enlarged scale, of a backlit display incorporating a prior art structured optical film layer and a hemi-bead structured optical film monolayer in accordance with the invention.

FIGS. 8A and 8B depict a backlit display 70 incorporating a prior art structured optical film layer 72 such as Vikuiti™ BEF and a hemi-bead structured optical film monolayer 74. Display 70 is backlit by light guide 76. FIG. 5D graphically depicts the angular distribution of light rays for a backlit display similar to display 70. Such displays can achieve a relative brightness gain, $G_n$, of about 1.8, within a wider range of viewing angles than the best prior art backlit displays. More particularly, FIG. 5D reveals an even more gradual reduction of relative brightness gain, $G_n$, as a function of viewing angle, than FIG. 5C.

Figures 9A, 9B:
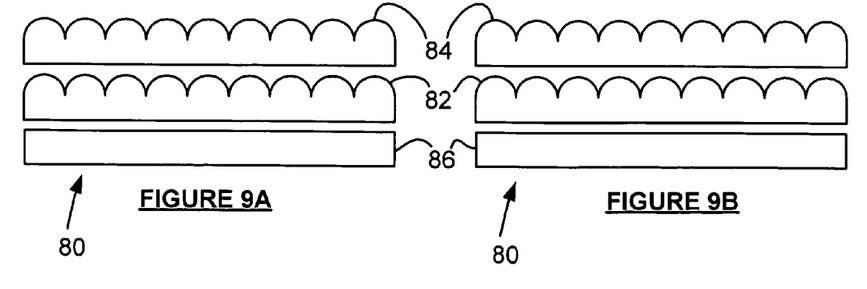
FIGS. 9A and 9B are respectively 90°-opposed cross-sectional side elevation views, on a greatly enlarged scale, of a backlit display incorporating two hemi-bead structured optical film monolayers in accordance with the invention.

FIGS. 9A and 9B depict a backlit display 80 incorporating two hemi-bead structured optical film monolayers 82, 84. Display 80 is backlit by light guide 86. Such displays can also achieve a relative brightness gain, $G_n$, of about 1.8, but with more gradual brightness reduction as a function of viewing angle than is achieved by prior art displays.

As will be apparent to those skilled in the art in the light of the foregoing disclosure, many alterations and modifications are possible in the practice of this invention without departing from the spirit or scope thereof. For example, although smaller diameter hemi-beads 28 are preferably provided in gaps 26 as aforesaid, the brightness of a backlit display can be enhanced without providing any smaller diameter hemi-beads in gaps 26. Specifically, practically useful brightness enhancement films can be formed by providing a solid transparent dielectric film bearing a monolayer of solid transparent dielectric hemi-beads which protrude from the film's outward viewing surface (i.e. a display surface directly viewable by an observer). Accordingly, the scope of the invention is to be construed in accordance with the substance defined by the following claims.

What is claimed is:

1. A backlit display having a brightness enhancement film mounted on an outward side of a light source of the display, the film comprising:
   (a) a transparent sheet formed of a solid transparent dielectric material; and
   (b) a first plurality of hemispherical solid transparent dielectric hemi-beads substantially covering and protruding outwardly from an outward surface of the sheet on an outward side of the light source.

2. A backlit display as defined in claim 1, wherein at least some of the hemi-beads have a minimum diameter of 2 microns.

3. A backlit display as defined in claim 1, wherein the sheet has a refractive index of at least 1.5 and the hemi-beads have a refractive index of at least 1.5.

4. A backlit display as defined in claim 1, wherein the sheet has a refractive index of at least 1.6 and the hemi-beads have a refractive index of at least 1.6.

5. A backlit display as defined in claim 1, wherein the first plurality of hemi-beads are closely packed in a monolayer.

6. A backlit display as defined in claim 1, wherein the first plurality of hemi-beads are hemispherical portions of spherical members partially embedded in the sheet.

7. A backlit display as defined in claim 1, wherein the first plurality of hemi-beads are hemispherical members affixed to the outward surface of the sheet.

8. A backlit display as defined in claim 1, further comprising a microreplicated prism film substantially macroscopically parallel to and on an inward side of the brightness enhancement film.

9. A backlit display as defined in claim 1, wherein the brightness enhancement film is a first brightness enhancement film, the display further comprising a second brightness enhancement film substantially macroscopically parallel to the first brightness enhancement film, the second brightness enhancement film further comprising a second plurality of hemi-spherical solid transparent dielectric hemi-beads substantially covering and protruding outwardly from an outward surface of the second brightness enhancement film on an outward side of the light source.

10. A brightness enhancement film for mounting on an outward side of a light source of a backlit display, the film comprising:
    (a) a transparent sheet formed of a solid transparent dielectric material;
    (b) a first plurality of approximately hemispherical solid transparent dielectric hemi-beads substantially covering and protruding outwardly from an outward surface of the sheet, at least some of the hemi-beads having a minimum diameter of 2 microns;

(c) a gap between adjacent ones of the first plurality of hemi-beads; and (d) at least some of the gaps containing at least one of a second plurality of approximately hemispherical solid transparent dielectric hemi-beads, each one of the second plurality of hemi-beads having a second average diameter less than the first average diameter.

11. A brightness enhancement film as defined in claim 10, wherein the sheet has a refractive index of at least 1.5 and the hemi-beads have a refractive index of at least 1.5.

12. A brightness enhancement film as defined in claim 10, wherein the sheet has a refractive index of at least 1.6 and the hemi-beads have a refractive index of at least 1.6.

13. A brightness enhancement film as defined in claim 10, wherein the first plurality of hemi-beads and the second plurality of hemi-beads are closely packed in a monolayer.

14. A brightness enhancement film as defined in claim 10, wherein at least 75% of the gaps containing at least one of the second plurality of hemi-beads.

15. A brightness enhancement film as defined in claim 3, wherein the first plurality of hemi-beads are hemispherical portions of spherical members partially embedded in the sheet and the second plurality of hemi-beads are approximately hemispherical portions of approximately spherical members partially embedded in the sheet.

16. A brightness enhancement film as defined in claim 10, wherein the first plurality of hemi-beads are hemispherical members affixed to the outward surface of the sheet and the second plurality of hemi-beads are approximately hemispherical members affixed to the outward surface of the sheet.

17. The backlit display having a brightness enhancement film as defined in claim 10.

18. The backlit display having substantially macroscopically parallel inward and outward brightness enhancement films, the inward film further comprising a microreplicated prism brightness enhancement film, and the outward film further comprising a brightness enhancement film as defined in claim 10.

19. The backlit display having substantially macroscopically parallel inward and outward brightness enhancement films, the inward film and the outward film each further comprising a brightness enhancement film as defined in claim 10.

20. A method of enhancing the brightness of a backlit display, the method comprising:

(a) providing an outward surface on an outward side of a light source of the display with a first sheet formed of a solid transparent dielectric material;

(b) substantially covering an outward surface of the first sheet with a first plurality of outwardly protruding, hemispherical solid transparent hemi-beads; and (c) guiding light rays emitted by the display through the first sheet and hemi-beads.

21. A method as defined in claim 20, further comprising closely packing the first plurality of hemi-beads in a monolayer.

22. A method as defined in claim 20, further comprising providing a second sheet formed of a solid transparent dielectric material, aligning the second sheet substantially macroscopically parallel to and inwardly of the first sheet, providing a plurality of microreplicated prisms on the second sheet, and guiding the light rays through the second sheet toward the first sheet.

23. A method as defined in claim 22, further comprising providing the plurality of microreplicated prisms on an outward surface of the second sheet.

24. A method of enhancing the brightness of a backlit display, the method comprising:

(a) providing an outward surface on an outward side of a light source of the display with a first sheet formed of a solid transparent dielectric material;

(b) substantially covering an outward surface of the first sheet with a first plurality of outwardly protruding, hemispherical solid transparent hemi-beads; and (c) guiding light rays emitted by the display through the first sheet and hemi-beads;

wherein a gap remains between adjacent ones of the first plurality of hemi-beads and wherein the first plurality of hemi-beads have a first average diameter, the method further comprising providing, in at least some of the gaps, at least one of a second plurality of approximately hemispherical transparent high refractive index hemi-beads, each one of the second plurality of hemi-beads having an second average diameter less than the first average diameter.

25. A method as defined in claim 24, further comprising closely packing the first plurality of hemi-beads and the second plurality of hemi-beads in a monolayer.

26. A method as defined in claim 24, further comprising providing at least one of the second plurality of hemi-beads in at least 75% of the gaps.

27. A method as defined in claim 24, further comprising providing a second sheet formed of a solid transparent dielectric material, aligning the second sheet substantially macroscopically parallel to and inwardly of the first sheet, substantially covering an outward surface of the second sheet with a second plurality of outwardly protruding, hemispherical solid transparent hemi-beads, and guiding the light rays through the second sheet toward the first sheet.

* * * * *

UNITED STATES PATENT AND TRADEMARK OFFICE
CERTIFICATE OF CORRECTION

PATENT NO.       : 7,286,280 B2  
APPLICATION NO.  : 11/080565  
DATED            : October 23, 2007  
INVENTOR(S)      : Lorne A. Whitehead and Michele Ann Mossman Page 1 of 1

It is certified that error appears in the above-identified patent and that said Letters Patent is hereby corrected as shown below:

• in claim 1, at column 8, line 28 change "an outward side of the light source" to —the outward side of the light source—

• in claim 9, at column 8, line 59 change "an outward side of the light source" to —the outward side of the light source—

• in claim 10, at column 9, lines 1-2 change "at least some of the hemi-beads having a minimum diameter of 2 microns" to —at least some of the first plurality of hemi-beads having a minimum first average diameter of 2 microns—

• in claim 14, at column 9, line 20 change "containing" to —contain—

Signed and Sealed this

Seventeenth Day of November, 2009

David J. Kappos  
*Director of the United States Patent and Trademark Office*